United States Patent
Zhou et al.

(10) Patent No.: US 8,518,599 B2
(45) Date of Patent: Aug. 27, 2013

(54) FUEL AND OXIDANT STORAGE DEVICE AND FUEL CELL SYSTEM EMPLOYING THE SAME

(75) Inventors: Xiaoping Zhou, Huzhou (CN); Yang Wu, Honolulu, HI (US); Jeff Qiang Xu, Sugarland, TX (US); Xiang Li, Huzhou (CN)

(73) Assignee: Microvast, Inc., Stafford, TX (US)

( * ) Notice: Subject to any disclaimer, the term of this patent is extended or adjusted under 35 U.S.C. 154(b) by 200 days.

(21) Appl. No.: 13/039,282

(22) Filed: Mar. 2, 2011

(65) Prior Publication Data

US 2011/0217624 A1 Sep. 8, 2011

Related U.S. Application Data

(60) Provisional application No. 61/309,495, filed on Mar. 2, 2010.

(51) Int. Cl.
*H01M 8/22* (2006.01)
(52) U.S. Cl.
USPC ................ 429/504; 429/512; 429/515
(58) Field of Classification Search
USPC .......................... 429/504, 512, 515
See application file for complete search history.

(56) References Cited

U.S. PATENT DOCUMENTS

| 6,924,049 B2* | 8/2005 | Rich, Sr. .................. 429/434 |
| 2006/0141321 A1* | 6/2006 | Pristash .................. 429/34 |
| 2008/0095689 A1 | 4/2008 | Adams et al. |
| 2008/0286621 A1 | 11/2008 | Rosenzweig et al. |
| 2008/0292915 A1 | 11/2008 | Kamitani et al. |
| 2008/0311460 A1 | 12/2008 | Kamitani et al. |
| 2009/0042082 A1* | 2/2009 | Townsend et al. .......... 429/34 |
| 2009/0317670 A1 | 12/2009 | Taniguchi et al. |

OTHER PUBLICATIONS

Andrew, M.R., et al., Engineering aspects of hydrazine-air fuel-cell power systems, Journal of Applied Electrochemistry 2: 327-336 (1972).
Salathe, R.E., et al., Military Hydrazine-Air Fuel Cell Power Supplies, p. 257-264, http://www.anl.gov/PCS/acsfuel/preprint%20archive/Files/11_3_CHICAGO_09-67_0257.pdf.
Gillis, E.I, Hydrazine-Air Fuel Cell Power Source, Electron Devices Meeting, 1966 International, vol. 12: 28.

* cited by examiner

*Primary Examiner* — Jane Rhee

(57) ABSTRACT

A fuel storage device for fuel cell comprises a tank-in-tank or tank-by-tank type tank. In addition, a pipe-in-pipe or pipe-by-pipe delivery system is also provided. A fuel cell system using the fuel storage device comprises liquid fuel at the anode side, liquid oxidant at the cathode side, electrolyte, fuel and oxidant tank-in-tank storage system, fuel and oxidant pipe-in-pipe deliverable system, and by-products handling at both the anode and cathode sides. The liquid fuels include amine-based compounds such as hydrazine, hydroxyl amine, ammonia, and their derivatives.

9 Claims, 4 Drawing Sheets

FUEL AND OXIDANT STORAGE DEVICE AND FUEL CELL SYSTEM EMPLOYING THE SAME

CROSS REFERENCE TO RELATED APPLICATIONS

This patent application claims the benefit of U.S. Provisional Application No. 61/309,495 filed Mar. 2, 2010.

BACKGROUND OF THE INVENTION

This invention relates generally to a fuel storage device and electrochemical fuel cell system employing the same. Fuel cells are efficient energy conversion devices established on electrochemistry principles. Fuel cells directly convert chemical energy stored in fuels and oxidants to electrical energy. The general oxidation and reduction can be expressed as:

$$[O]+[R] \rightarrow P$$

[O] represents oxidant or oxidants; [R] represents reductant or reductants; P represents product or products.

Reductant or reductants act as fuel or fuels during fuel cell reaction processes. Fuel cells are well-known electrochemical devices and avoid Carnot cycle energy losses compared with combustion engines. Generally, fuel cells can reach 45-65% electrical efficiency in practice.

In the past, several types of fuel cells have been developed and progress has been made. Fuel cells can be generally categorized by the electrolytes that the reaction uses. Table 1 lists the most commonly seen types of fuel cells developed by industry and the academic world.

TABLE 1

Different Type of Fuel Cells

| Type | Electrolyte | Conductive Ion | Working Temperature (° C.) | Development Stage | System Size |
|---|---|---|---|---|---|
| Alkaline Fuel Cell (AFC) | KOH/NaOH | OH⁻ | Room temp.-200 | Well developed and applied | 1-100 kW |
| Molten Carbonate Fuel Cell (MCFC) | Molten carbonate salt | $CO_3^{2-}$ | 500-700 | Developing and demonstrating | |
| Phosphoric Acid Fuel Cell (PAFC) | $H_3PO_4$ | $H^+$ | 100-200 | Well developed and applied | 1 kW-2 MW |
| Proton Exchange Membrane Fuel Cell (PEMFC) | Perfluorinated polymer (e.g. Nafion) | $H^+$ | Room temp.-125 | Developing and demonstrating | 1-300 kW |
| Solid Oxide Fuel Cell | Ceramic (e.g. $Y_2O_3/ZrO_2$) | $O^{2-}$ | 600-1000 | Developing and demonstrating | 1-200 kW |

Alkaline fuel cells ("AFC") and Proton Exchange fuel cells ("PEMFC") are two kinds of fuel cells that can be operated in a relatively low temperature range. PEMFCs use solid electrolytes such as E. I. DuPont Nafion® membrane, a fully fluorinated Teflon-based polymeric material that is able to conduct proton ions. Due to their moderate working temperature range and performance characteristics, PEMFCs have received much attention as a potential alternative power source for automotive applications in the last decades. Hydrogen gas is the most popular fuel associated with PEMFC applications. Due to the absence of $H_2$ infrastructure worldwide and catalysts associated with noble metals such as Pt, Rh, and more, the PEMFC adoption is very slow and much promise has disappeared in the past few years.

Traditional AFCs suffer low tolerance of $CO_2$ because they react with the electrolytes to form carbonate salt. This has limited AFCs to use pure $H_2$ as a fuel and pure $O_2$ as an oxidant. AFCs exhibit excellent reaction kinetics in the oxidant side (cathode) and can use nickel, cobalt, and other low-cost metals as catalysts. If a non-$CO_2$ fuel and a suitable oxidant can be identified, one can take full advantage of the AFC-specific characteristics.

US 2008/0145733 A1 and CN 101138112 A patent applications report the use of hydrazine ($N_2H_4$) or diamine as the fuel and oxygen ($O_2$) as the oxidant. Co, Co/C, and Pt/C catalysts were used at fuel side (anode) as catalyst, respectively. The over-potential phenomenon (voltage loss) is reduced when Co and Co/C catalysts were used. This result confirms that a non-noble catalyst is a good option to catalyze hydrazine oxidation at the basic condition.

Hydrazine, or diamine, in the form of propellant for thrusters, is by far the most common means of spacecraft propulsion and altitude control. Based on the prior art, hydrazine-oxygen fuel cells are considered superior to ammonia ($NH_3$) and methanol ($CH_3OH$) fuel cells, and next to hydrogen units in specific power (see S. S. Tomter and A. P. Anthony, The Hydrazine Fuel Cell System in Fuel Cells, American Institute of Chemical engineers, New York (1963), pp. 22-31). Hydrazine is reactive and highly soluble in the electrolyte, yielding high current densities. As of the late 1960s, hydrazine fuel cells awaited a significant cost reduction to see their widespread application. Hydrazine monopropellant systems have also been used as auxiliary power units on aircraft.

Conventional fuel cells that use liquid fuels such as methanol and ethanol have poor reactivity and thus cannot produce the power output necessary and sufficient for automotive applications. Using hydrazine hydrate, which possesses excellent reactivity with an oxygen oxidant, the new fuel cell can produce a high output of 0.5 W/cm² (as reported by Daihatsu in "Daihatsu Develops Platinum-Free, Direct Hydrazine Fuel Cell Technology", 14 Sep. 2007), which is comparable to the output obtained from a hydrogen/oxygen fuel cell using a platinum catalyst in a PEMFC based system.

Fuel Handling and Safety Issues

Concentrated hydrazine hydrate ($N_2H_4.H_2O$) is designated as a poisonous oxidant, and it must be handled under the same safety standards applicable to gasoline and most toxic industrial chemicals.

Hydrazine is also listed among shock-sensitive chemicals, as a chemical prone to rapidly decompose or explode when struck, vibrated, or otherwise agitated. It is flammable in mixtures with air from 4.7% to 100% hydrazine. Without addressing the safety concerns of fuel storage and delivery, fuel cells using hydrazine or its similar derivatives or other chemical compounds as fuels will be impractical, especially in automotive applications.

With the objective of ensuring safe fuel use, storage, and delivery, US 2009/0318662 A1 patent application discloses a hydrazine storage resin that is able to fix the hydrazine hydrate into the fuel tank through the use of the resin. Its chemistry principle is believed to be based on the following chemical reaction:

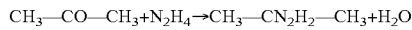

The resin or polymer in the fuel tank acts as a medium allowing hydrazine to be properly and safely stored, and in the meantime to be able to convert or supply hydrazine in a timely manner for fuel cell system. Although this disclosure addresses on-board fuel tank safety in the case of tank damage during automobile collisions or other incidents, it suffers a few drawbacks such as the kinetics of fuel conversion and system complexity. Particularly, the power density will be decreased due to the slow or sluggish fuel/chemicals conversion step.

BRIEF SUMMARY OF THE INVENTION

In light of the safety problems with conventional fuel storage for fuel cells described above, the current invention provides a fuel and oxidant storage device which allows the fuel to be stored safely, and a fuel cell system employing the same. The fuel and oxidant storage device of the current invention comprises a tank-in-tank ("TIT") type tank or a tank-by-tank ("TBT") type tank. The TIT type tank comprises an inner tank and an outer tank, the inner tank being located inside of the outer tank. The inner tank is designed for storing fuel, and the outer tank is designed for storing the oxidant which can react with the fuel. The TBT type tank comprises two side-by-side tanks that can be packed by an enclosure. One tank is designed for storing fuel, and the other is designed for storing the oxidant which can react with the fuel. In the case of a fuel tank being damaged and even broken, the oxidants will react with the fuel, thereby achieving safe storage and supply of hydrazine and other similar fuels.

The current invention also provides a fuel delivery system, which comprises a pipe-in-pipe ("PIP") delivery system or a pipe-by-pipe ("PBP") delivery system. The PIP delivery system comprises an outer pipe and an inner pipe. The inner pipe is located inside of the outer pipe. The inner pipe is designed for supplying fuel, and the outer pipe is designed for supplying the oxidant which can react with the fuel. The PBP delivery system comprises two side-by-side pipes that can be packed by an enclosure. One pipe is designed for supplying fuel, and the other is designed for supplying the oxidant which can react with the fuel. The fuel pipe is connected to the fuel tank and the oxidant pipe is connected to the oxidant tank.

The current invention also provides a fuel cell system employing the fuel storage device above. According to another aspect of the current invention, the current invention also provides a fuel cell system employing the fuel storage device and the fuel delivery system above. The fuel cell system of the current invention specifically addresses hydrazine, hydroxyl amine, ammonia, and/or their derivatives as fuels. According to another aspect of the current invention, the fuel cell system uses liquid-type chemicals as oxidants at the cathode side to alleviate the above-mentioned fuel safety concerns in fuel cell systems through unique configurations of fuel and oxidant storage and delivery. Thus, the power density of fuel cell system will not be sacrificed and the fuel cell system will be a much simpler system compared with the prior art. More specifically, the fuel cell system of the current invention comprises liquid fuel at the anode side, liquid oxidant at the cathode side, electrolyte, and fuel and oxidant delivery systems. In addition, the fuel cell system further comprises a product handling system.

According to an exemplary embodiment of the current invention, the fuel cell system comprises a fuel and oxidant storage tank-in-tank ("TIT") device, in which the liquid-type oxidant is stored in the outer tank and the fuel is stored in the inner tank. According to another aspect of the current invention, the fuel cell system comprises a fuel and oxidant storage tank-by-tank ("TBT") system. According to another aspect of the current invention, the fuel cell system comprises a fuel and oxidant deliverable pipe system, in which the fuel and oxidant pipe are placed as a pipe-in-pipe ("PIP") system. According to another aspect of the current invention, the fuel cell system comprises a fuel and oxidant deliverable pipe system, in which the fuel and oxidant pipe are placed in a pipe-by-pipe ("PBP"). According to another aspect of the current invention, the fuel cell system comprises only the liquid-type of oxidant at the cathode. According to another aspect of the current invention, the fuels used in this current invention are specifically $N_2H_4$, $NH_2OH$, and $NH_3$. According to another aspect of the current invention, the oxidants used in this invention are $MClO^-$, $MClO_2^-$, $MClO_3^-$, $MClO_4^-$, $MBrO^-$, $MBrO_2^-$, $MBrO_3^-$, $MBrO_4^-$, $MIO^-$, $MIO_2^-$, $MIO_3^-$, and $MIO_4^-$. M refers to cations from alkaline metal elements such as $Li^+$, $Na^+$, and $K^+$. According to another aspect of the current invention, the oxidants used in this invention are $MClO^-$, $MClO_2^-$, $MClO_3^-$, and $MClO_4^-$. According to another aspect of the current invention, the oxidants used in this invention are $NaClO$, $NaClO_2$, $NaClO_3$, and $NaClO_4$.

According to another aspect of the current invention, the fuel cell system includes the fuel and oxidant deliverable configuration to facilitate the use of hazardous and toxic compounds as fuels and oxidants in the fuel cell system. According to one aspect of the current invention, the fuel cell system comprises a fuel and oxidant storage and deliverable configuration to facilitate the use of hydrazine, hydroxyl amine, ammonia, or its derivatives as a direct oxidation fuel in the alkaline fuel cell system. According to another aspect of the current invention, the fuel cell system comprises an anode electrode, a cathode electrode, an electrolyte that is conducting ions and insulating electrons, a fuel and oxidant tank, a fuel and oxidant deliverable system and an anode and cathode product handling system.

DETAILED DESCRIPTION OF THE INVENTION

Figure 1A:
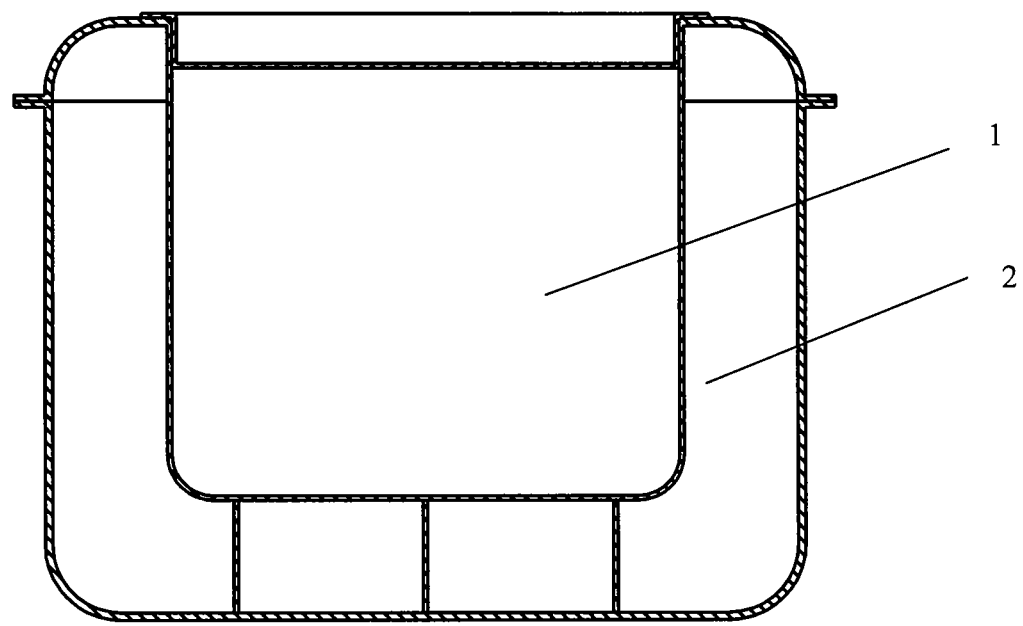
FIG. 1A is a side view of a tank-in-tank (TIT) fuel and oxidant storage system as another embodiment of the current invention.

The detailed descriptions of the current invention set forth below in connection with the drawings and examples are preferred embodiments of the current invention and are not limited to represent the only embodiments and forms described thereafter.

Current fuel cell technologies including proton exchange membrane fuel cells ("PEMFC") and proton exchange membrane based direct methanol fuel cells ("DMFC") use either hydrogen or methanol as primary fuels to generate electricity. In the past decades, fuel cells incorporating these fuels and oxygen or air as the oxidant have been applied to power automobiles and electronic applications. Technically, the catalysts used in anode and cathode, electrolyte or conductive ion membrane, manifold design, bipolar plate design and material, cell components' assembly called membrane electrode assembly ("MEA"), cell stack design, fuel processing, and balance of plant ("BOP") have been researched and developed extensively. Although the variety of fuel cells have been developed for commercialization, the real implementation of fuel cells is staggered due to a few reasons. One of the reasons is the readiness of fuel and fuel infrastructure. Hydrogen is a high energy content fuel, but it is difficult to store and transport. Methanol is relatively much easier to store and transport, but direct methanol fuel cells are still in the developing stage. Both electrical efficiency and power density of the above-mentioned fuel cells are not sufficient to power automobile applications.

AFCs use KOH or NaOH as electrolytes, and the conductive ion is $OH^-$. Traditional AFCs operate on compressed hydrogen and oxygen, and hydroxyl ions ($OH^-$) migrate from the cathode to the anode. At the anode, $H_2$ gas reacts with $OH^-$ to generate $H_2O$ and electrons. Electrons generated at the anode supply electrical power to an external load, then return to the cathode. At the cathode, the electrons react with oxygen and $H_2O$ to produce more $OH^-$ that diffuses into the electrolyte. AFCs received substantial research and development attention between the 1950s and 1970s, and were successfully used in aerospace industry. AFC applications have confirmed not only high fuel conversion efficiency (the electrical efficiency can reach 70%), but also high power and energy density. AFCs must use pure hydrogen as the fuel, and it has been a major drawback to AFC applications in other industries. When the impure $CO_2$ existed in $H_2$, it reacted with $OH^-$ to form solid carbonates that will affect normal fuel cell reaction. Another drawback for AFC is the use of a platinum catalyst in the anode and the cathode. Thus, AFC is only limited to a few specific applications, such as aerospace industry.

Liquid-type fuels such as hydrazine and ammonia have been proposed and developed for AFCs. Although the prior art disclosed the use of hydrazine and ammonia as fuels, the hazardous nature of these fuels has hindered their commercialization significantly. Ammonia and hydrazine are ideal fuels for a direct fuel cell system because these fuels do not emit $CO_2$ as a by-product, and they demonstrate significant benefits such as high electrochemical potential and no poison effect to the catalyst used at the anode.

To ensure safe use of hydrazine, the prior art unveiled a few technologies to use hydrazine hydrate ($N_2H_4.H_2O$) after solidification. In many countries, hydrazine hydrate is specified as a deleterious oxidant when the concentration exceeds a certain weight percentage. The prior art proposed a system in which hydrazine hydrate is normally stored in a fixed state, and only the required quantity is liquefied and supplied for the fuel cell reaction. More specifically, hydrazone is obtained by bonding hydrazine with a polymer having a carbonyl group ($C=O$) and stored in the storage tank. The fuel derivative can be re-liquefied and returned to a hydrazine hydrate state by a hydrolysis reaction when it is used as a fuel at the anode. When it is used in a vehicle application, the polymer with a carbonyl group is provided at a fuel tank. The prior art also proposed that hydrazine hydrate supplied from a fuel station is solidified and stored as hydrazone state in the tank. When the vehicle is actually driven, the system is designed to supply warm water ($H_2O$) to the tank so that the hydrazone reacts with it to generate hydrazine hydrate as the fuel. At present, hydrazine is industrially produced from ammonia ($NH_3$).

Ammonia can also be used as the fuel for the fuel cell system. The advantages of using $NH_3$ include its easy availability, high solubility with water, high energy content, and it is easily stored and transported. However, because it is sluggish and less reactive in the direct fuel cell oxidation process, it has not been successfully used in any large scale applications. Hydroxyl amine ($NH_2OH$) is another excellent candidate to be used as fuel in a direct fuel cell system. Hydroxyl amine exhibits similar physical and chemical characteristics with the above-mentioned $N_2H_4$ and $NH_3$ fuels. These fuels are toxic and hazardous in nature and they need to be handled in a safe and cautious way. We have not found any efficient and effective handling processes from the prior art, especially when these fuels are considered to be used in fuel cell systems to power vehicles and other applications.

The current invention discloses embodiments to address fuel safety concerns and issues. Hydrazine, ammonia, and their derivatives have demonstrated uniqueness as fuels in an alkaline fuel cell system. The noble metals will not be needed as catalysts in both the anode and cathode sides of an alkaline fuel cell. High power density can also be realized in a proper single fuel cell and cell stack set-up if a proper fuel handling process can be achieved.

The current invention specially addresses hydrazine, hydroxyl amine, ammonia, or their derivatives as fuels, and using liquid-type chemicals as oxidants at the cathode side to alleviate fuel storage, handling, and deliverable safety concerns in fuel cell systems. It is known that a direct liquid fuel oxidation fuel cell has a lot of advantages compared to using direct gas as a fuel. Methanol is used as a primary fuel in PEMFC, and direct methanol fuel cells ("DMFC") are a good example. Since methanol is still a hydrocarbon-based compound, $CO_2$ will be still emitted as a by-product. Therefore, methanol is not a good choice in power vehicles. $N_2H_4$, $NH_3$, and $NH_2OH$ are nitrogen-based compounds and their independence from petroleum and $CO_2$ emission makes them superior candidates as fuels for a fuel cell system.

Focusing on the safety issue of a fuel cell system using hydrazine, hydroxyl amine, ammonia or their derivatives as fuel, the current invention provides a tank-in-tank ("TIT") type tank or a tank-by-tank ("TBT") type tank as the fuel and oxidant storage device. The said TIT type tank comprises an outer tank and an inner tank; the inner tank is located in the inside of the outer tank. The inner tank is designed for storing fuel, and the outer tank is designed for storing the oxidant which can react with the fuel. The said TBT type tank comprises two side-by-side tanks that can be packed by an enclosure; one tank is designed for storing fuel, and another tank is designed for storing the oxidant which can react with the fuel. In the case of fuel tank being damaged and even broken, the oxidant will react with the fuel, thereby achieving safe storage and supply of hydrazine and other similar fuels.

This so-called tank-in-tank ("TIT") or tank-by-tank ("TBT") storage system is configured mainly for safety. When the tank is struck from the outside during an accident, the oxidant tank is the first tank to absorb the force or stress. Thus, the fuel tank is protected because the oxidant tank is acting as a cushion. In a specific case, when the impact force is too large from the outside, both the oxidant tank and fuel tank could be damaged and even broken. The fuel and oxidant coming out from a broken tank would react with each other and thus the toxic fuel and hazardous concern is no longer an issue for the environment and surrounding people.

Figure 1B:
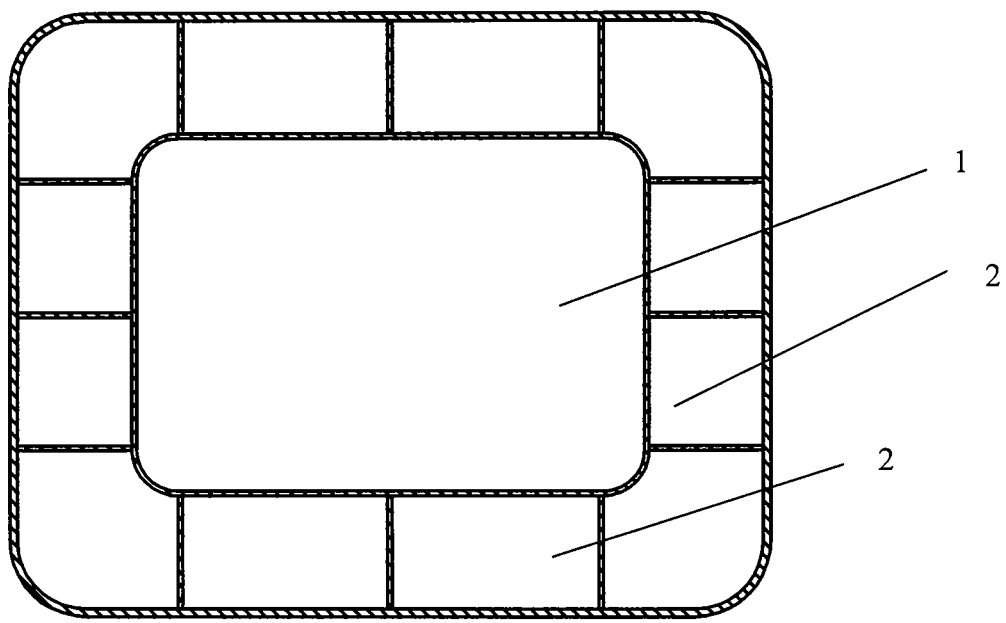
FIG. 1B is a top view of a tank-in-tank (TIT) fuel and oxidant storage system as another embodiment of the current invention.

FIG. 1A and FIG. 1B disclose an embodiment of the current invention that includes a very specific fuel and oxidant storage tank-in-tank ("TIT") system, in which the liquid-type oxidant is designed to be stored in outer tank 2 (also called oxidant tank) and the liquid fuel is designed to be stored in inner tank 1 (also called fuel tank). FIG. 1A is a side view of a TIT fuel and oxidant storage tank. According to one aspect of the current invention, the TIT storage is designed and built as an inner fuel tank located in the inside of a liquid oxidant tank. According to another aspect of the current invention, the TIT storage is capable of handling hazardous fuel when an unexpected accident happens. For example, when the tank is placed in a fuel cell automobile application, if the outer force or stress causes the tank to be damaged and even broken, the liquid oxidant could react with the liquid fuel. Therefore, the safety and hazardous issue of liquid fuel will no longer be an issue. FIG. 1B is a top view of a TIT fuel and oxidant storage tank.

Figure 2A:
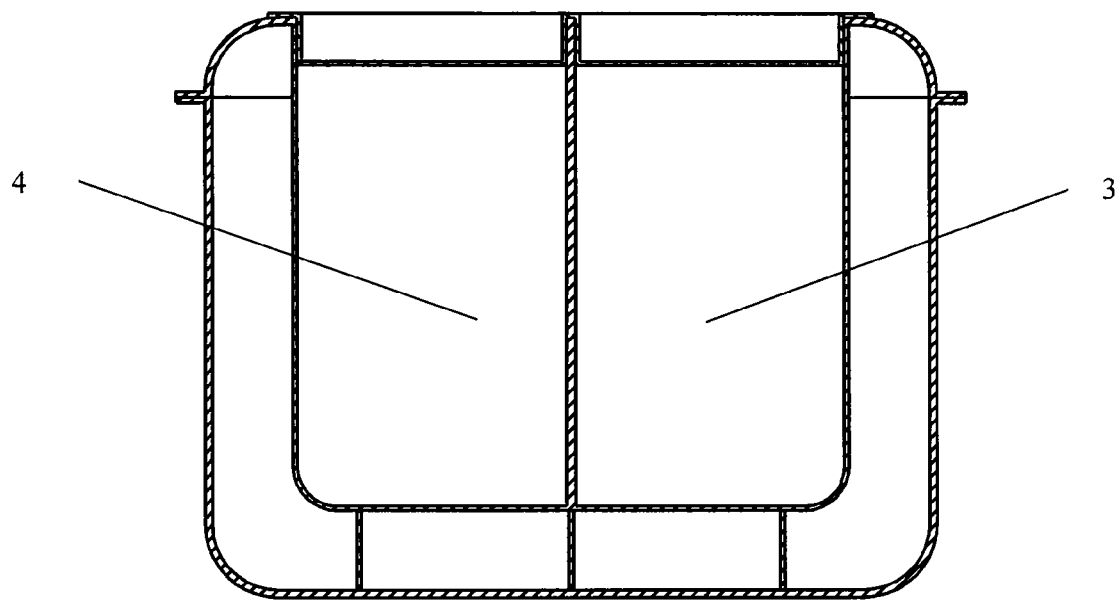
FIG. 2A is a side view of a tank-by-tank (TBT) fuel and oxidant storage system as another embodiment of the current invention.
Figure 2B:
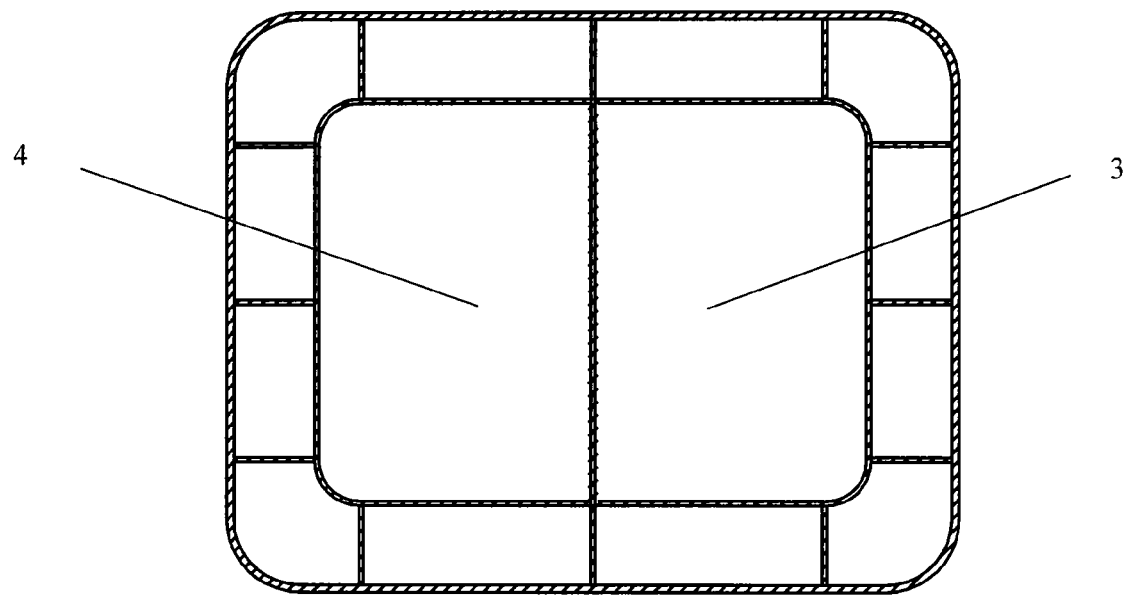
FIG. 2B is a top view of a tank-by-tank (TBT) fuel and oxidant storage system as another embodiment of the current invention.

FIG. 2A and FIG. 2B disclose an embodiment of the current invention that includes a very specific fuel and oxidant storage tank-by-tank ("TBT") system, in which the liquid-type fuel is designed to be stored in tank 4 and oxidant is designed to be stored in tank 3, side by side. According to one aspect of the current invention, the fuel cell of the current invention comprises a fuel and oxidant TBT system, in which the fuel and the oxidant are stored in tanks sit side-by-side or in parallel, and the two side-by-side or parallel tanks can be packed by an enclosure if needed. According to another aspect of the current invention, the TBT storage is capable of handling hazardous fuel when an unexpected accident happens. For example, when the tank is placed in a fuel cell automobile application, if the outer force or stress causes the two tanks to be damaged and even broken, the liquid oxidant could react with the liquid fuel. Therefore, the safety and hazardous issue of liquid fuel will be no longer an issue. FIG. 2B is a top view of a TBT fuel and oxidant storage tank.

Figure 3:
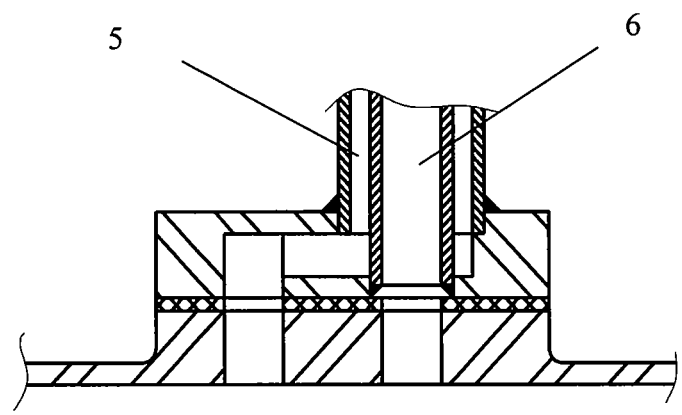
FIG. 3 is an example configuration of a pipe-in-pipe (PIP) as another embodiment of the current invention.

FIG. 3 discloses an embodiment of the current invention that includes a very specific fuel and oxidant pipe-in-pipe ("PIP") delivery system, in which the liquid-type oxidant is transferred in outer pipe 5 (also called oxidant pipe), and the liquid fuel is transferred in inner pipe 6 (also called fuel pipe). FIG. 3 is an example configuration of a PIP delivery set-up. According to one aspect of the current invention, the PIP delivery system is designed and built as an inner fuel pipe located in the inside of liquid oxidant pipe. According to another aspect of the current invention, the PIP delivery system is capable of handling hazardous fuel when an unexpected accident happens. For example, when the pipe is placed in a fuel cell automobile application, if the outer force or stress causes the pipe to be damaged and even broken, the liquid oxidant could react with the liquid fuel stored in the inner pipe. Therefore, the safety and hazardous issue of liquid fuel will no longer be an issue.

Figure 4:
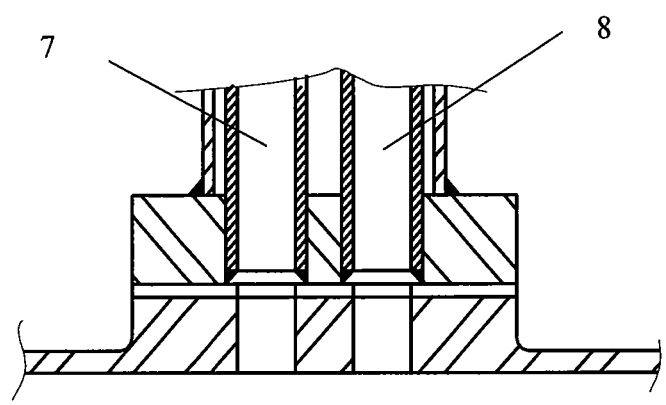
FIG. 4 is an example configuration of a pipe-by-pipe (PBP) as another embodiment of the current invention.

FIG. 4 discloses an embodiment of the current invention that includes a very specific fuel and oxidant pipe-by-pipe ("PBP") delivery system, in which the liquid-type fuel and oxidant are transferred in the pipe side by side or in parallel. According to one aspect of the current invention, the current invention comprises a fuel and oxidant PBP delivery system, in which the fuel and the oxidant are transferred in pipe 7 and pipe 8 side by side or in parallel, and the two side-by-side or parallel pipes can be packed by an enclosure. According to another aspect of the current invention, the PBP delivery system is capable of handling hazardous fuel when an unexpected accident happens. For example, when the pipe is placed in a fuel cell automobile application, if the outer force or stress causes the two pipes to be damaged and even broken, the liquid oxidant coming out from the broken pipe could react with the liquid fuel. Therefore, the safety and hazardous issue of liquid fuel will be no longer be an issue.

Figure 5:
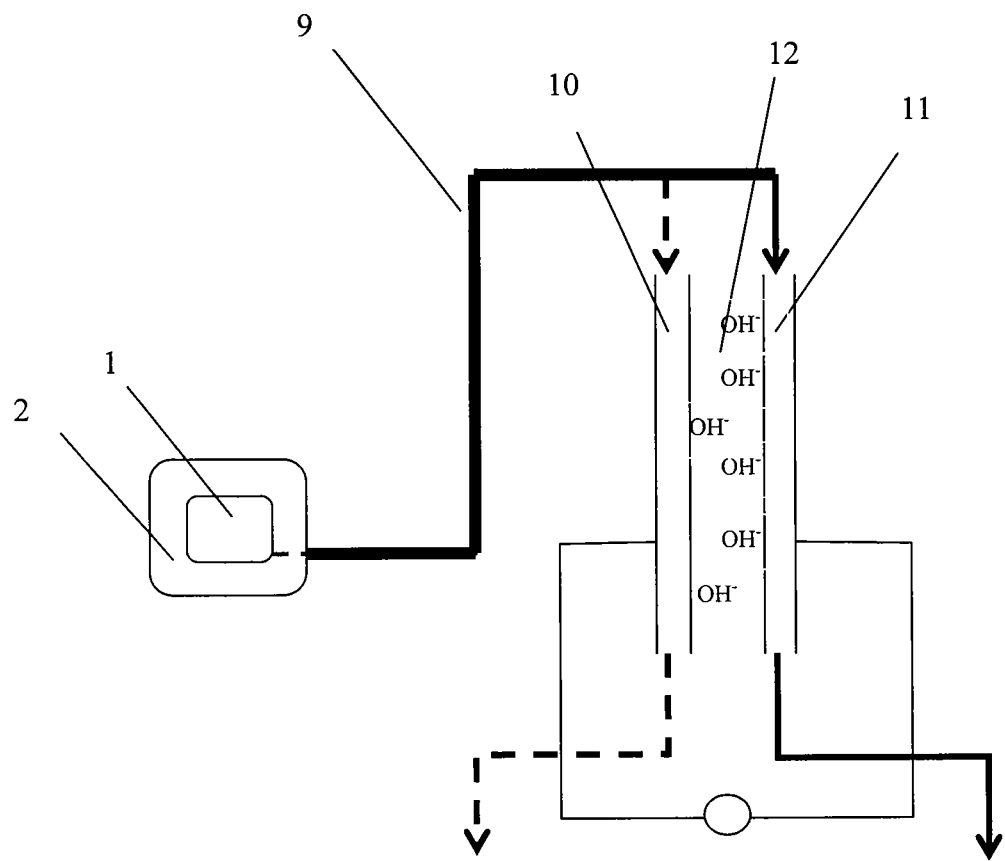
FIG. 5 is one embodiment of the current invention, and the fuel cell system includes a fuel storage tank and delivery, oxidant storage tank and delivery, anode electrode, cathode electrode, electrolyte, and load.

FIG. 5 proposes an embodiment through unique configurations of fuel and oxidant storage and delivery to address the toxic and hazardous nature of amine-based compounds as fuels in the fuel cell system. More specifically, the fuel cell of the current invention comprises liquid fuel at anode side 10, liquid oxidant at cathode side 11, electrolyte 12, fuel and oxidant tank-in-tank ("TIT") storage system, fuel and oxidant pipe-in-pipe ("PIP") delivery system 9. According to one aspect of the current invention, the current invention comprises a safe fuel and oxidant storage and deliverable set-up. The liquid oxidant is stored at the outer tank 2, and inner tank 1 is the fuel tank where fuel is stored. This so-called tank-in-tank ("TIT") storage system is configured mainly for safety and hazardous control. When the tank is struck from the outside during an accident, the oxidant tank is the first tank to absorb the force or stress. Thus, the fuel tank is protected because the oxidant tank 2 is acting as a cushion. In a specific case, when the impact force is too large, both oxidant tank 2 and fuel tank 1 would be broken. The fuel and oxidant coming out from the damaged or broken tank will react with each other, and thus the toxic fuel and hazardous concern will no longer be an issue for the environment and surrounding people. According to another aspect of the current invention, the fuel cell system includes a pipe-in-pipe ("PIP") deliverable system where the oxidant is transferred in the outer pipe and the fuel is transferred in the inner pipe. In another specific case, when the deliverable pipe is broken, the outer oxidant pipe will be a main protected pipe to either absorb force from the outside or react with fuel when the fuel pipe is also broken. According to another aspect of the current invention, the fuel cell system includes liquid fuel and liquid oxidant deliverable and introduction set-up to allow the fuel and the oxidant properly into the anode and cathode surface for electrochemical reaction. According to another aspect of the current invention, the fuel cell system includes an anode, cathode, and electrolyte that function to facilitate electrochemical oxidation and reduction taking place. According to another aspect of the current invention, the fuel cell system includes by-products emission system at both the anode and cathode sides. According to another aspect of the current invention, the emission system includes fuel recycling at the anode side, gas emission at anode side, water storage and/or discharge at the anode side, and chemical solution storage and/or discharge at the cathode side.

According to one aspect of the current invention, the fuel cell system comprises only liquid-type of fuel and oxidant at the anode and cathode. According to another aspect of the current invention, the fuels used in this current invention are specifically $N_2H_4$, $NH_2OH$, $NH_3$, and their derivatives. According to another aspect of the current invention, the fuels used in this current invention are specifically $N_2H_4$, $NH_2OH$, and $NH_3$. According to another aspect of the current invention, the oxidants used in this invention are $MClO^-$, $MClO_2^-$, $MClO_3^-$, $MClO_4^-$, $MBrO^-$, $MBrO_2^-$, $MBrO_3^-$, $MBrO_4^-$, $MIO^-$, $MIO_2^-$, $MIO_3^-$, and $MIO_4^-$. M refers to cations from alkaline elements such as $Li^+$, $Na^+$, and $K^+$. According to another aspect of the current invention, the oxidants used in this invention are $MClO^-$, $MClO_2^-$, $MClO_3^-$, and $MClO_4^-$. According to another aspect of the current invention, the oxidants used in this invention are $NaClO$, $NaClO_2$, $NaClO_3$, and $NaClO_4$.

According to another aspect of the current invention, the current invention includes the fuel and oxidant deliverable configuration to facilitate the use of hazardous and toxic compounds as fuels and oxidants in the fuel cell system. According to one aspect of the current invention, the fuel cell system comprises a fuel and oxidant storage and deliverable configuration to facilitate the use of hydrazine, hydroxyl amine, ammonia, and their derivatives as a direct oxidation fuel in alkaline fuel cell system. According to another aspect of the current invention, the fuel cell system comprises an anode electrode, a cathode electrode, an electrolyte that is conducting hydroxyl ions and insulating electrons, a fuel and oxidant tank, a fuel and oxidant deliverable system, an anode and cathode by-product handling system.

The First Exemplary Fuel Cell

The first exemplary fuel cell was constructed according to the FIG. 1 configuration. Hydrazine hydrate ($N_2H_4$ in 30% weight percentage) was used as a fuel and stored at the inner tank of tank-in-tank ("TIT") storage. $NaClO_3$ (1 M) was chosen as a liquid oxidant and was stored at the outer tank of tank-in-tank ("TIT") storage. The fuel and oxidant transfer were carried out in the pipe-in-pipe ("PIP") deliverable system. The relevant anodic and cathodic reactions are as follows:

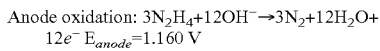
Anode oxidation: $3N_2H_4+12OH^- \rightarrow 3N_2+12H_2O+ 12e^-$ $E_{anode}$=1.160 V

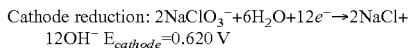
Cathode reduction: $2NaClO_3^-+6H_2O+12e^- \rightarrow 2NaCl+ 12OH^-$ $E_{cathode}$=0.620 V

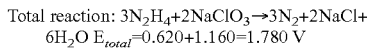
Total reaction: $3N_2H_4+2NaClO_3 \rightarrow 3N_2+2NaCl+ 6H_2O$ $E_{total}$=0.620+1.160=1.780 V The Second Exemplary Fuel Cell The second exemplary fuel cell was also constructed according to the FIG. 1 configuration. Hydroxyl amine ($NH_2OH$ in 30% weight percent aqueous solution) was used as a fuel and stored at the inner tank of tank-in-tank ("TIT") storage. $NaClO_3$ (1 M) was chosen as a liquid oxidant and was stored at the outer tank of tank-in-tank ("TIT") storage. The fuel and oxidant transfer were carried out in the pipe-in-pipe ("PIP") deliverable system. The relevant anodic and cathodic reactions are as follows:

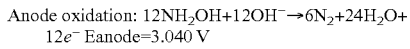
Anode oxidation: $12NH_2OH+12OH^- \rightarrow 6N_2+24H_2O+ 12e^-$ $E_{anode}$=3.040 V

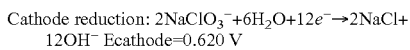
Cathode reduction: $2NaClO_3^-+6H_2O+12e^- \rightarrow 2NaCl+ 12OH^-$ $E_{cathode}$=0.620 V

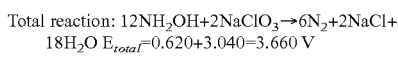
Total reaction: $12NH_2OH+2NaClO_3 \rightarrow 6N_2+2NaCl+ 18H_2O$ $E_{total}$=0.620+3.040=3.660 V The Third Exemplary Fuel Cell The third exemplary fuel cell was also constructed according to the FIG. 1 configuration. Ammonia solution ($NH_3$ in 30% weight percent aqueous solution) was used as a fuel and stored at the inner tank of tank-in-tank ("TIT") storage. $NaClO_3$ (1 M) was chosen as a liquid oxidant and was stored at the outer tank of tank-in-tank ("TIT") storage. The fuel and oxidant transfer were carried out in the pipe-in-pipe ("PIP") deliverable system. The relevant anodic and cathodic reactions are as follows:

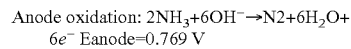
Anode oxidation: $2NH_3+6OH^- \rightarrow N_2+6H_2O+ 6e^-$ $E_{anode}$=0.769 V

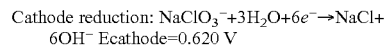
Cathode reduction: $NaClO_3^-+3H_2O+6e^- \rightarrow NaCl+ 6OH^-$ $E_{cathode}$=0.620 V

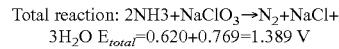
Total reaction: $2NH3+NaClO_3 \rightarrow N_2+NaCl+ 3H_2O$ $E_{total}$=0.620+0.769=1.389 V The use of amine-based compounds such as hydrazine, hydroxyl amine, and ammonia as fuels and $NaClO_3$ liquid chemical as oxidant is by way of example only and not by way of limitation. Those skilled in the art will appreciate that other types of liquid fuels and oxidants may be utilized or chosen to take advantage of the current invention, specially, the safe fuel and oxidant handling issue, more specially, to use hazardous and toxic fuels. It is understood that the above-described exemplary fuel cells and drawings represent only a few presently preferred embodiments of the current invention. Other modifications, improvements, and additions can be made without departing from the scope of this current invention.

What is claimed:

1. A fuel cell system comprising:
a tank-in-tank type tank comprising:
 an outer tank;
 an inner tank located in the inside of the outer tank;
   wherein the inner tank is designed for storing oxidant which can react with the fuel;
 an anode electrode;
 a cathode electrode;
 an electrolyte;
a pipe-in-pipe delivery system comprising:
 an outer pipe;
 an inner pipe located inside of the outer pipe;
   wherein the inner pipe is designed for supplying fuel, and the outer pipe is designed for supplying oxidant which can react with the fuel,
 further wherein the inner pipe is connected to a fuel tank and the outer pipe is connected to an oxidant tank.

2. A fuel cell system comprising:
a tank-by-tank type tank comprising:
 a first tank;
 a second tank, wherein the first tank is designed for storing fuel and the second tank is designed for storing oxidant which can react with the fuel
 an anode electrode;
 a cathode electrode;
 an electrolyte;
a pipe-in-pipe delivery system comprising:
 an outer pipe;
 an inner pipe located inside of the outer pipe;
   wherein the inner pipe is designed for supplying fuel, and the outer pipe is designed for supplying oxidant which can react with the fuel,
 further wherein the inner pipe is connected to a fuel tank and the outer pipe is connected to an oxidant tank.

3. The fuel cell system of claim 1 or 2, wherein the first tank and the second tank are packed by an enclosure.

4. The fuel cell system of claim 1 or 2, wherein the fuel is liquid-type fuel.

5. The fuel cell system of claim 4, wherein the liquid-type fuel is selected from the group comprising hydrazine, hydroxyl amine, ammonia, and their derivatives.

6. The fuel cell system of claim 1 or 2, wherein the oxidant is liquid-type oxidant.

7. The fuel cell system of claim 6, wherein the oxidant is a salt selected from the group consisting of ClO—, ClO2-, ClO3-, ClO4-, BrO—, BrO2-, BrO3-, BrO4-, IO—, IO2-, IO3-, and IO4-.

8. The fuel cell system of claim 6, wherein the oxidant is an alkaline metal salt.

9. The fuel cell system of claim 8, wherein the salt is selected from the group consisting of $NaClO$, $NaClO_2$, $NaClO_3$, and $NaClO_4$.

* * * * *